United States Patent [19]
Louie et al.

[11] Patent Number: 4,547,849
[45] Date of Patent: Oct. 15, 1985

[54] INTERFACE BETWEEN A MICROPROCESSOR AND A COPROCESSOR

[76] Inventors: Glenn Louie, 274 Andsbury, Mountain View, Calif. 94043; Rafi Retter, 19 Adam Hacohen St., Neve Shaanan, Haifa 32714, Israel; James Slager, 6230 Pasos Los Cerritos, San Jose, Calif. 95120

[21] Appl. No.: 615,081

[22] Filed: Aug. 17, 1984

Related U.S. Application Data

[63] Continuation of Ser. No. 328,973, Dec. 9, 1981, abandoned.

[51] Int. Cl.[4] .............................................. G06F 15/16
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,940,743 | 2/1976 | Fitzgerald | 364/200 |
| 4,006,466 | 2/1977 | Patterson et al. | 364/200 |
| 4,099,236 | 7/1978 | Goodman et al. | 364/200 |
| 4,106,092 | 8/1978 | Millers, III | 364/200 |
| 4,181,936 | 1/1980 | Kober | 364/200 |
| 4,214,305 | 7/1980 | Tokita et al. | 364/200 |
| 4,365,294 | 12/1982 | Stokken | 364/200 |

*Primary Examiner*—Eddie P. Chan
*Attorney, Agent, or Firm*—Owen L. Lamb

[57] ABSTRACT

A nonclock-synchronous interface between a microprocessor and a coprocessor. A request line (404) from the coprocessor and an acknowledgment line (402) from the microprocessor provide for operand transfer from the coprocessor to the microprocessor. A busy line (410) and an error line (408) from the coprocessor allow the microprocessor to monitor the condition of the coprocessor. Data (406) are transferred through a data channel in the microprocessor using the full memory management and protection mechanism of the microprocessor so that the protection mechanism is not circumvented. A memory-read cycle is generated using the address taken from the memory-address register (401). The data is buffered inside the microprocessor and the coprocessor's request is acknowledged. The memory-address register is then incremented by a predetermined amount and an I/O write cycle is generated using a prewired address into the coprocessor. Data are transferred in the opposite direction in a similar manner using the prewired address to obtain the read data from the coprocessor which data is buffered inside of the microprocessor. A memory-write cycle is then generated by the processor using an address taken from the channel memory-address register and the data equal to the data buffered.

4 Claims, 6 Drawing Figures

INTERFACE BETWEEN A MICROPROCESSOR AND A COPROCESSOR

This application is a continuation, of application Ser. No. 328,973, filed Dec. 9, 1981, now abandoned.

BACKGROUND OF THE INVENTION

1. Field of the Invention

The present invention relates to microprocessors, and more particularly, to apparatus for controlling the movement of data to and from a slave coprocessor.

2. Description of the Prior Art

In U.S. Pat. No 4,442,484 of Robert Childs, Jr., et al entitled "Microprocessor Memory Management and Protection Mechanism," granted on Apr. 10, 1984, and assigned to a common assignee, Intel Corp., there is described a memory management and protection mechanism in which access to protected entitites is controlled. The memory-protection mechanism provides protection of a task from other tasks, protection of a segment at one level from any task at a less privileged level, and immediate detection of attempted protection violations.

It is desirable to utilize the microprocessor described in the Childs, et al patent application as a master microprocessor with a slave coprocessor, such as an 8087 Math Processor, with the coprocessor being subject to the same protection rules as the master microprocessor. In order to do this, it is necessary to provide an interface which will allow the transfer of operands between the attached coprocessor and main memory without circumventing the protection mechanism in the microprocessor.

Prior to the development of large-scale integration (LSI) technology, the interfaces between computer components were mainly concerned with transferring data at the highest speed possible commensurate with the electrical characteristics of the cables between the units and the electronic circuits which drive signals on the cables. The use of these prior interfaces with LSI microprocessors is prohibitive because there are not enough input/output pins available on the LSI package with present-day technology. An LSI microprocessor has to use fewer actual lines interconnecting the modules, but still meet the requirement of being able to handle data movement and control operations just as complex as those of previous data processing systems.

It is therefore a primary object of this invention to provide an interface between a master microprocessor and a slave coprocessor which utilizes a minimum number of input/output pins and which does not circumvent the memory-protection mechanism of the master microprocessor.

BRIEF SUMMARY OF THE INVENTION

Briefly, the present invention is concerned with an interface between a master microprocessor and a slave coprocessor which share a memory address bus and data bus connected to a main memory. The coprocessor has means capable of reserving an I/O address dedicated to data transfers between the master microprocessor and the slave coprocessor. The master microprocessor has a data channel comprising control logic connected to a first signal line from the coprocessor to the master processor (COREQ), and a second signal line from the master processor to the coprocessor (COACK#). A memory address register containing an address therein corresponding to a main memory address is connected to the address bus. An I/O address register is also connected to the address bus. The I/O address register contains a fixed address therein corresponding to an I/O address of the coprocessor reserved for data transfers to and from the main memory. A data buffer register is connected to the data bus. The control logic is responsive to the COREQ signal line for transferring data from the main memory to the data register during a first cycle, the data being read from an address in main memory corresponding to an address stored in the memory address register. The transferring means includes means for energizing the COACK# signal line to acknowledge the coprocessor request during the first cycle. An incrementer responsive to the control means, operative during the first cycle, increments the contents of the memory address register. Means responsive to the control means, operative during a second cycle, places the read data in the data buffer register on the data bus and places the address in the I/O address register on the address bus. This transfers the data to the coprocessor.

Data are transferred from the coprocessor to main memory via the data channel in the following manner. The control logic is responsive to the COREQ signal line for transferring data from the coprocessor to the data register during a first cycle, the data being read from an address in the coprocessors memory corresponding to an address stored in the I/O address register. The transferring means includes means for energizing the COACK# signal line to acknowledge the coprocessor request during the first cycle. Means responsive to the control means, operative during a second cycle, places the read data in the data buffer register on the data bus and places the address in the memory address register on the address bus. This transfers the data to the main memory. An incrementer responsive to the control means, operative during the second cycle, increments the contents of the memory address register.

The invention has the advantage that data transfers are fully memory protected because the data to and from the slave coprocessor are transferred indirectly to and from main memory via the master processor memory-protection mechanism.

BRIEF DESCRIPTION OF THE DRAWINGS

The foregoing and other objects, features, and advantages of the invention will be apparent from the following detailed description of a preferred embodiment of the invention as illustrated in the accompanying drawings wherein.

DESCRIPTION OF THE INVENTION

Figure 1:
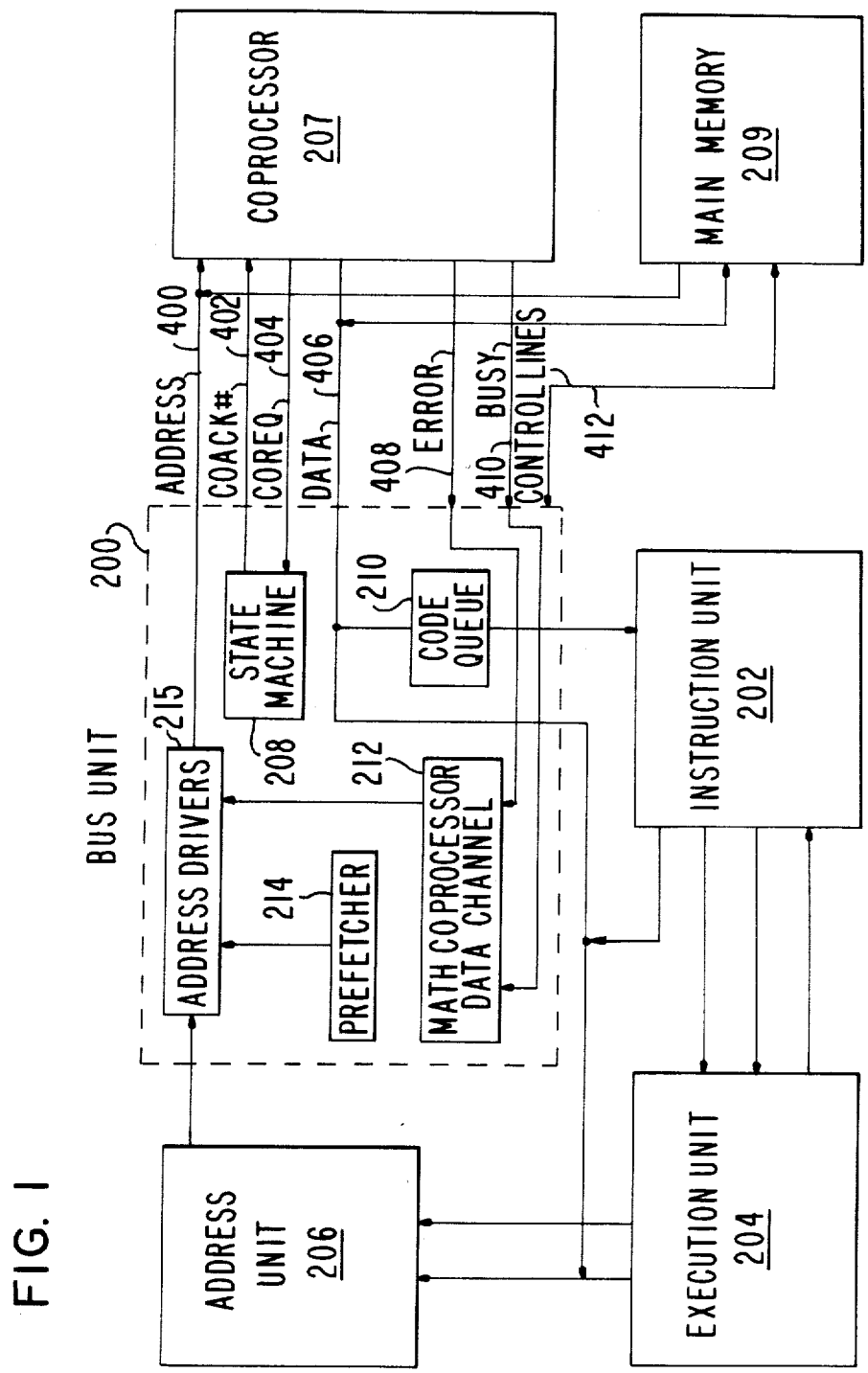
FIG. 1 is a functional block diagram illustrating the various components of a microprocessor in which the invention is embodied.

FIG. 1 is a block diagram of a microprocessor in which the present invention is embodied. U.S. Pat. No. 4,442,484 of Robert Childs, Jr., et al entitled "Microprocessor Memory Management and Protection Mechanism," granted on Apr. 10, 1984 assigned to a common assignee, Intel Corporation, is incorporated herein by reference. In that patent there is described a memory management and protection mechanism in which access to protected entities is controlled. The memory-protection mechanism provides protection of a task from other tasks, protection of a segment at one level from any task at a less privileged level, and immediate detection of attempted protection violations. The protected entities are represented by descriptors. Each protected entity is accessed via a selector which comprises an index integer assigned to the descriptor at the time of its creation. Tasks are active entities which may perform accesses and therefore are subject to control. A task has certain access rights. Each protected entity is assigned a specific privilege level. Each task within the system operates at one and only one privilege level at any instant in time. Protected entities which reside at a privilege level which is equal or less privileged than the current privilege level (CPL) of the task are generally accessible. The effective privilege level (EPL) of an access to a protected entity is defined as the numeric maximum of the CPL and the requested privilege level (RPL) present in the selector pointing to the memory semgent to be accessed. An access is permitted if and only if the EPL is numerically less than or equal to the descriptor privilege level (DPL), assigned to the protected entity.

The microprocessor disclosed in the Childs, Jr. et al patent is comprised for four logical units, each capable of operating as an independent state machine, using pipelining. These units are called the Bus Unit (200), the Instruction Unit (202), the Execution Unit (204), and the Address Unit (206). Each of these units is described in detail in the above-identified Childs Jr. et al patent. The microprocessor is connected to a memory (209) and input/output units by means of the Bus Unit which is attached to an address bus, a data bus, and a plurality of control lines. As described herein, a coprocessor (207) is attached to the same buses and utilizes four extra control lines, COACK#, COREQ, ERROR#, and BUSY#. The coprocessor may, for example, be an Intel 8087 Numeric Coprocessor which is described in the 8086 Family User's Manual, Numerics Supplement, July 1980, copies of which may be obtained from: Literature Department, Intel Corporation, 3065 Bowers Avenue, Santa Clara, CA 95051.

The bus unit provides the logic for the interface with memory and external input/output subsystems. It contains a bus cycle controller state machine (208) and dedicated functional blocks for implementing code prefetch (214) and a math coprocessor data channel (212). The bus unit (200) is the logical unit in which the present invention is embodied, and is shown in more detail in FIG. 2. Reference should be made to FIG. 3 of the abovereferenced Childs Jr. et al patent application for details of how the bus unit connects to the other units of the system.

A bus cycle prioritizer examines bus cycle requests from four different sources and prioritizes them as follows:
 External bus masters (HOLD request).
 Math coprocessor data channel.
 Address unit.
 Code prefetcher.

It can be seen that the code prefetcher (214) has lowest priority for bus cycles and, therefore, will prefetch code when there are no other demands for bus cycles.

The code prefetcher and the math coprocessor data channel both operate on real addresses which have been previously prepared by the address unit along with a real address limit required for memory protection enforcement. In this way both the prefetcher and data channel may generate bus cycles which are performed solely by the bus unit without assistance (other than for initialization) by the other units.

During periods when the memory bus would otherwise be idle, the code prefetcher (214) obtains code from memory under the assumption that the microprocessor is executing sequentially. Code obtained in this way is placed in a code queue (210) where it is available for access by the instruction unit (202). Whenever the microprocessor ceases sequential execution (i.e., executes some form of branch) the code queue is flushed and the prefetcher is initialized with a new real address and limit. Whenever the prefetcher attempts to fetch from an illegal location, as indicated by the prefetcher limit, the Bus Unit refuses to perform the memory cycle and places a violation marker in the code queue.

The instruction unit (202) is designed to decode and format instructions in order to relieve the execution unit of this function so that instruction execution will be faster. The instruction unit obtains bytes of code from the bus unit code queue and prepares fully decoded instructions in its instruction queue.

The execution unit (204) is where actual instruction execution occurs. It contains the main registers and ALU as well as several dedicated logic boxes for fast execution.

The address unit (206) performs three address calculations for each bus cycle. One calculation is to form the effective address (EA) as the sum of two register contents and the address displacement from the instruction queue. The second calculation is to compare the EA to the limit of the selected segment to determine if a protection violation has occurred. The third calculation is to add the EA to the base value of the selected segment in order to form the real address.

In order for the internal logical units to work together efficiently, it is necessary that information be moved to and from memory fast enough to prevent the queues from running dry. Therefore, as described in the above-refernced Childs Jr. et al patent, a high bandwidth memory interface is required. The memory interface pipelines bus cycles so that each bus cycle consists of three processor cycles, but successive bus cycles can be performed at the rate of one bus cycle every two processor cycles.

In addition to providing a high bandwidth bus, maximizing throughput also requires that the collision rate between bus cycles be minimized. The prefetcher only runs memory cycles when the execution unit does not need the bus to perform data reads or writes. The prefetcher is given lowest priority when the bus unit prioritizes bus requests.

Figure 2:
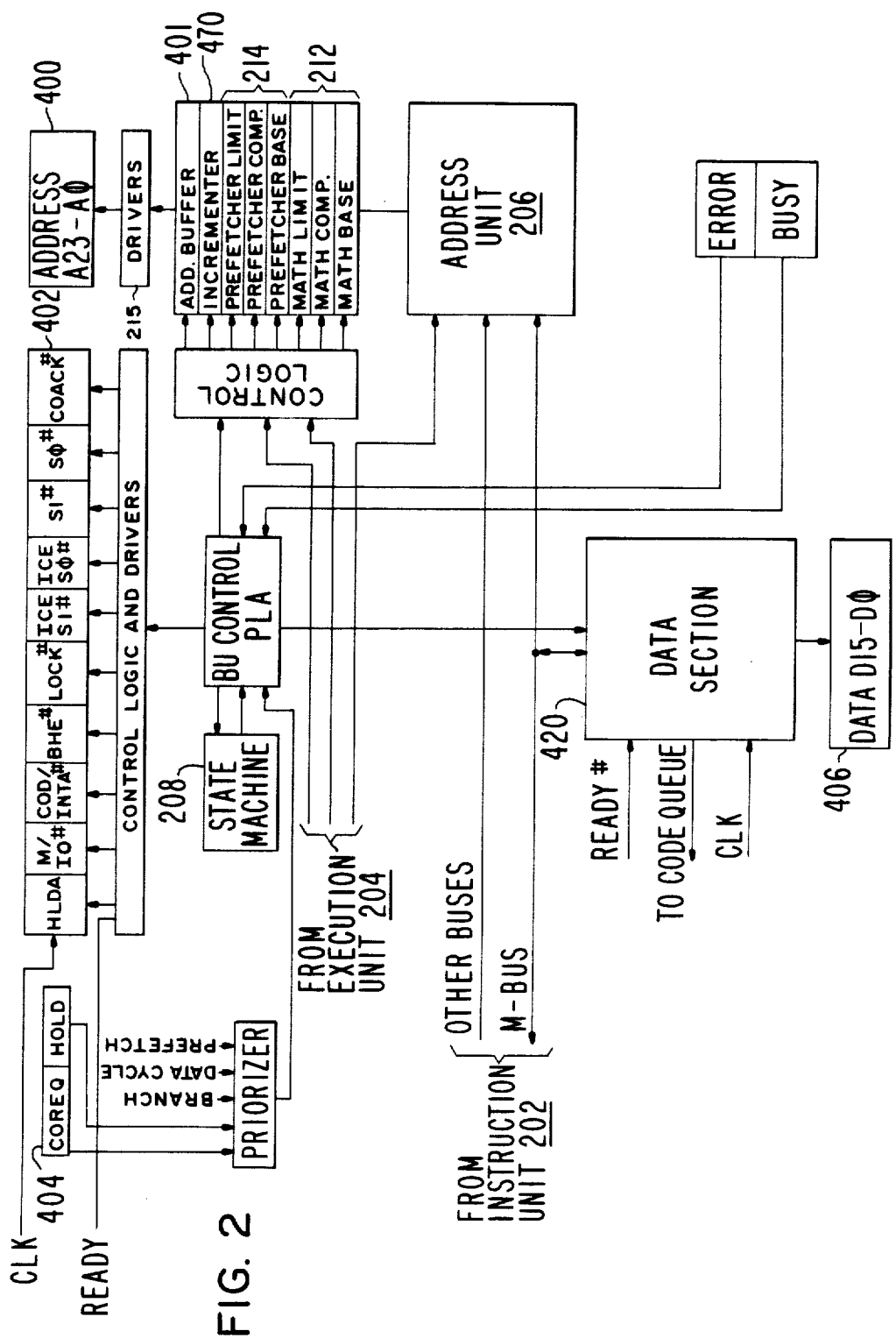
FIG. 2 is a more detailed block diagram of the bus unit shown in FIG. 1.
Figure 3:
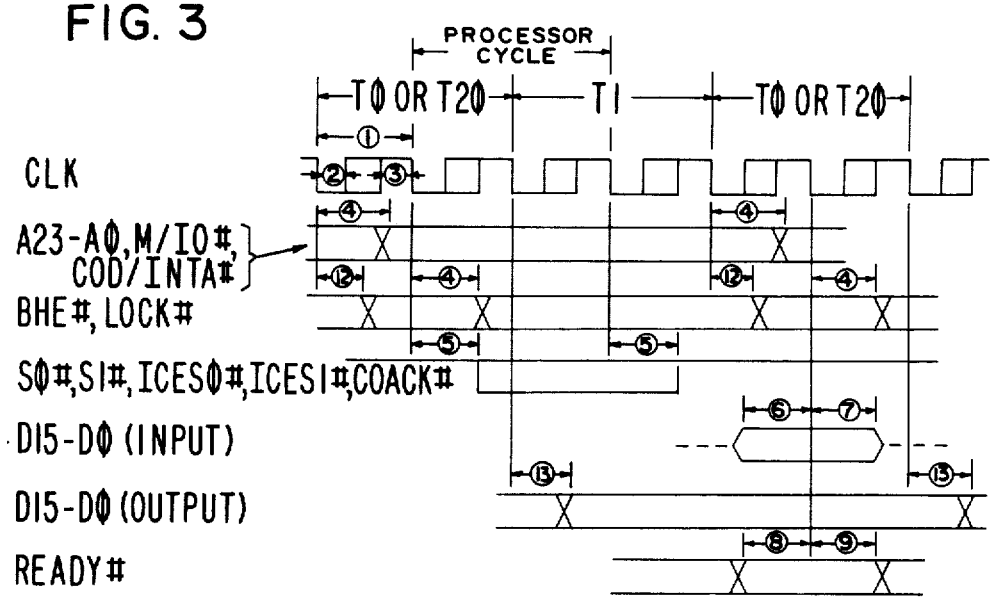
FIG. 3 is a timing diagram illustrating bus cycle timing.

Refer now to FIG. 2 which is a more detailed block diagram of the Bus Unit in which the present invention is embodied. The logic blocks are labeled with reference numerals which are the same as the reference numerals used in FIG. 3 of the above-identified Childs Jr. et al patent. For ease of understanding, only the elements of the Bus Unit are shown in FIG. 2, whereas in addition to the bus unit the elements of all the other units of the microprocessor are shown in detail in FIG. 3 of the aboveidentified Childs Jr. et al patent.

The bus unit is responsible for supplying code to the instruction unit. To this end the bus unit generates main memory cycles as required to obtain code and places this code in a code queue. The output of the code queue is available to the instruction unit for removal of code bytes.

The bus unit includes a prefetch mechanism which fetches code bytes in advance of their being required by the instruction unit.

The bus unit is responsible for coordinating the sequencing of data cycles and prefetch cycles, since only one cycle can be performed at a time. Since the execution unit is required to wait on data reads, data cycles are given priority over prefetch cycles so that if a data cycle and a prefetch cycle are ready to begin simultaneously, the prefetch cycle will be forced to wait. Any cycle, once initiated, will run to completion without interruption for any other type of cycle.

Data cycles are initiated by the address unit which passes a 24-bit real address to the bus unit along with read/write information. Upon completion of a read cycle, data is passed from the bus unit to the execution unit. At the beginning of a write cycle, data is passed from the execution unit to the bus unit.

The address unit also informs the bus unit as to whether the current data cycle is to be performed upon a byte or a word. This information is used to control the bus high enable signal (BHE#). In addition, the address also instructs the bus unit as to which address space is to be used, ICE or user's. This information is used to select which bus cycle status signals to use, S0# and S1# or ICES0# and ICES1#.

The bus unit also includes temporary address latches (401) and data latches (within data section 420). These latches are used to buffer the address and data for a write cycle if the bus unit is busy with a current bus cycle. This buffering allows the execution unit to proceed with execution instead of waiting for the bus unit to complete the current bus cycle. If a write cycle is initiated by the execution unit while the bus unit buffers are busy, the bus unit will require the execution unit to wait until the current cycle terminates and the buffer contents are removed for use in the next bus cycle.

The bus unit contains a coprocessor data channel for support of a math coprocessor. This channel operates in a manner which is very similar to direct memory access. The channel contains an address counter and a limit checker so that all data transfers can be made to comply with protection requirements.

Miscellaneous bus cycles include I/O, interrupt acknowledge, and halt/shutdown cycles. These cycles are all initiated by the execution unit. The bus unit treats them as data cycles in regard to prioritization so that the bus unit can inhibit the prefetcher in order to avoid lost clock cycles due to bus collisions. Therefore the execution unit is seldom required to wait because the bus is busy with a prefetch.

During each processor cycle, the bus unit polls and prioritizes all of the bus cycle requests in order to grant the next available bus cycle to the highest priority request. The requests are prioritized in the following way:

| | |
|---|---|
| (HIGHEST) | External bus masters which are attempting to gain control of the bus through use of the HOLD signal. |
| | The coprocessor data channel. |
| | The execution unit. |
| (LOWEST) | The prefetcher. |

The instruction unit accepts code bytes from the code queue of the bus unit and prepares instructions in the instruction queue. This instruction queue is accessible by the execution unit.

MASTER MICROPROCESSOR INTERFACE

Pin Functions

Table I lists the master microprocessor pin signal names and definitions. The 68 pins of the master microprocessor include:

24 pins for address (400)
16 pins for data (406)
10 pins for bus and processor control (412)
2 pins for interrupt (406)
4 pins for Coprocessor (402, 404, 408, 410)
5 pins for ICE and
7 pins for power, ground, clock, and substrate filter.

The 24-bit address bus is used to output the memory-mapped real address and the separate 16-bit data bus is provided for data transfers. The memory-mapping address translation and memory-protection limit testing are performed internally on the master microprocessor instead of on an external device. This allows the translation and limit testing to be performed for the next memory cycle overlapped with the completion of the current memory cycle. Hence, no bus bandwidth is lost due to the address translation and limit testing. Due to the demultiplexed address and data buses, consecutive bus cycles can be pipelined so that the beginning of the next bus cycle is overlapped with the end of the current bus cycle. The result is that fully address-translated and limittested bus cycles can be performed at the rate of one every two processor cycles and memory access time is essentially that required for a three-processor-cycle bus cycle.

Bus and processor control is similar to that of the MCS-86 system MAX mode except that certain modifications are made in order to optimize the system for high bus bandwidth. (The MCS-86 is a single board microcomputer system and is described in the 8086 Family User's Manual dated October 1979, copies of which may be obtained from: Literature Department, Intel Corporation, 3065 Bowers Avenue, Santa Clara, CA 95051).

For example, selection between memory cycles and I/O cycles is no longer encoded in the bus cycle status signals but, instead, is provided on an M/IO# pin which has electrical timing equivalent to the address bus so that more time is allowed for address decoders to map I/O address space and to distinguish between I/O addresses and memory addresses. Bus hold request and acknowledge signals are provided for allowing arbitration of asynchronous bus masters which desire to gain control of the processor bus.

TABLE I

Master Microprocessor Pin Functions

| Signal Names | No. of Pins | Input/Output | Description |
|---|---|---|---|
| A23-A0 | 24 | O | Address. |
| D15-D0 | 16 | I/O | Data. |
| S0#, S1# | 2 | O | Bus cycle status. |
| COD/INTA# | 1 | O | Code read/int. ack. |
| M/IO# | 1 | O | Memory-I/O select. |
| READY# | 1 | I | Bus cycle ready. |
| BHE# | 1 | O | Bus high enable. |
| RESET | 1 | I | System reset, clock divider initialization. |
| LOCK# | 1 | O | Bus lock. |
| HOLD | 1 | I | Bus hold request. |
| HLDA | 1 | O | Bus hold acknowledge. |
| INTR | 1 | I | Interrupt request. |
| NMI | 1 | I | Nonmaskable interrupt request. |
| COREQ | 1 | I | Math coprocessor operand request. |
| COACK# | 1 | O | Math coprocessor operand acknowledge. |
| ERROR#, BUSY# | 2 | I | Math coprocessor status. |
| ICEBP# | 1 | I | ICE breakpoint. |
| ICE31, ICE20 | 2 | O | ICE instruction pointer status. |
| , ICES1# | 2 | O | ICE bus cycle status. |
| VSS | 3 | I | System ground. |
| VCC | 2 | I | +5v supply. |
| CAP | 1 | I | Substrate filter capacitor. |
| CLK | 1 | I | System clock. |

Two interrupt request signals are provided. These are MCS-86 compatible INTR and NMI signals.

A coprocessor interface is provided for use with the slave MATH microprocessor device. This interface includes the COREQ and COACK# signals for requesting and acknowledging operand transfers and the BUSY# and ERROR# signals which allows the master microprocessor to monitor the condition of the slave microprocessor.

An efficient In Circuit Emulation (ICE) interface is provided by the dedication of five master microprocessor pins. These pins provide adequate information for the ICE system to rack processor execution and generate breakpoints.

The master microprocessor utilizes a pipelined bus cycle with nonmultiplexed address and data buses in order to support the high execution rate of the Execution Unit.

Three types of cycles are used to describe master microprocessor operation, a CLK cycle, a processor cycle, and a bus cycle.

A CLK cycle is one period of the waveform which is connected to the master microprocessor CLK pin. In a standard master microprocessor system the frequency of this signal is 16 MHz.

The internal master microprocessor logic is driven from a clocking system which is generated by dividing the CLK waveform by two. One period of this clocking system is called a processor cycle. In a standard master microprocessor system the frequency of this clocking system is 8 MHz.

Communications between the internal master microprocessor hardware and external devices is accomplished by means of bus cycles. A bus cycle consists of an integer number of processor cycles. The minimum bus cycle consists of three processor cycles but, due to pipelining, these bus cycles can come at a rate of one bus cycle every two processor cycles. Therefore, the maximum bus rate is four million bus cycles per second, or eight million bytes per second. A bus cycle can be lengthened beyond the minimum by a delayed activation of the READY# signal.

BUS SIGNALS

Master Microprocessor pins which are devoted to bus support are listed in Table II.

TABLE II

| Signal Names | No. of Pins | Input/Output | Description |
|---|---|---|---|
| A23-A0 | 24 | O | Address bus. |
| D15-D0 | 16 | I/O | Data bus. |
| S1#, S0# | 2 | O | User bus cycle status. |
| ICES1#, ICES0# | 2 | O | ICE bus cycle status. |
| BHE# | 1 | C | Bus high enable. |
| M/IO# | 1 | O | Memory/IO select. |
| COD/INTA# | 1 | O | Code cycle/Interrupt acknowledge. |
| LOCK# | 1 | O | Bus lock. |
| READY# | 1 | I | Bus ready. |
| HOLD | 1 | I | Bus hold request. |
| HLDA | 1 | O | Bus hold acknowledge. |

BUS CYCLE TYPES

The master microprocessor bus can perform cycles of the following types:

INPUT CYCLES

Code Read. Memory reads which fetch program.

Data Read. All other memory reads.

I/O Read. Response to IN, INW, Block I/O Input, etc.

Interrupt Acknowledge. Response to receipt of a maskable interrupt.

Halt. Response to execution of the HALT instruction.

Shutdown. Results from three protection violations on the same instruction.

OUTPUT CYCLES

Memory Write. Any memory write.

I/O Write. Response to OUT, OUTw, Block I/O output, etc.

BUS CYCLE STATUS

The master microprocessor supports two physical buses: the user's bus and the ICE bus. User bus cycle status signals, S1# and S0# support the user's bus and ICE bus cycle status signals, ICES1# and ICES0# support the ICE bus. All remaining bus signals listed in Table II support both buses. The ICE bus is used only for Data Read, Code Read, Halt, Shutdown, and Memory Write cycles. The user bus is used for all the cycle types listed above. The following description considers only the user bus, although it can be applied to the ICE bus by substituting ICES1# and ICES0# for S1# and S0#, respectively.

The fact that a bus cycle is beginning is indicated by S1# or S0# or both going active, and the fact that a bus cycle is terminating is indicated by the bus ready signal (READY#) going active except for Halt or Shutdown cycles which do not require termination. The particular type of bus cycle is indicated by the COD/INTA#, M/IO#, S1#, and S0# signals in conformance with Table III.

TABLE III

| COD/INTA# | M/IO# | S1# | S0# | Cycle Type |
|---|---|---|---|---|
| 0 (low) | 0 | 0 | 0 | Interrupt acknowledge. |
| 0 | 0 | 0 | 1 | Does not occur. |
| 0 | 0 | 1 | 0 | Does not occur. |
| 0 | 0 | 1 | 1 | Not a bus cycle. |
| 0 | 1 | 0 | 0 | IF A1=1, THEN halt ELSE shutdown. |
| 0 | 1 | 0 | 1 | Data read. |
| 0 | 1 | 1 | 0 | Memory write. |
| 0 | 1 | 1 | 1 | Not a bus cycle. |
| 1 (high) | 0 | 0 | 0 | Does not occur. |
| 1 | 0 | 0 | 1 | I/O read. |
| 1 | 0 | 1 | 0 | I/O write. |
| 1 | 0 | 1 | 1 | Not a bus cycle. |
| 1 | 1 | 0 | 0 | Does not occur. |
| 1 | 1 | 0 | 1 | Code read. |
| 1 | 1 | 1 | 0 | Does not occur. |
| 1 | 1 | 1 | 1 | Not a bus cycle. |

BUS HIGH ENABLE

The Bus High Enable signal (BHE#) is used to indicate whether or not the high order half of the data bus (D15-D8) contains valid information during any particular bus cycle. This signal along with the least significant address bit (A0) are sufficient to determine the validity of both data bus halves as indicated by Table IV.

TABLE IV

| BHE# | A0 | D15-D8 | D7-D0 | Comment |
|---|---|---|---|---|
| 0 (low) | 0 | Valid | Valid | Full word transfer |
| 0 | 1 | Valid | Invalid | Byte on upper half |
| 1 (high) | 0 | Invalid | Valid | Byte on lower half |
| 1 | 1 | — | — | Does not occur |

WORD OPERATIONS ON ODD ADDRESSES

The master microprocessor allows word operations on odd address boundaries. This type of operation requires the master microprocessor to perform two bus cycles, the first of which transfers the low-order byte of the word on the upper half of the data bus and has BHE#=0 and AO=1. The second bus cycle transfers the high-order byte of the word on the lower half of the data bus and has BHE#=1 and AO=0.

These word operations on odd addresses reduce throughput since only one bus cycle would be required if the word were aligned to an even boundary.

Stacks at Odd Addresses. All stack pushes or pops are word transfers. Therefore, if a stack begins at an odd address, all pushes and pops will require two cycles.

Math Word Transfers at Odd Memory Addresses. The slave coprocessor always transfers operands as words. If the words are aligned at odd-byte boundaries, then each word transfer will require two memory cycles.

Word I/O Operations at Odd I/O Addresses. Device I/O addresses should always be chosen on even boundaries to prevent double cycles on word transfers. This is especially important for operations such as block I/O.

Code Prefetch at Odd Addresses. There is one exception to the double-cycle rule. This exception is the prefetcher mechanism, which is self-adjusting to even addresses. This means that if a program jumps to an odd address, the first code fetch obtains one byte and then the prefetcher begins fetching words at the next even address.

BUS LOCK

The bus lock signal (LOCK#) is provided to support operations which require consecutive access to memory without the possibility of some other processor inserting an intervening access. Examples of these operations are:

Acknowledgment of the Maskable Interrupt. This operation requires two consecutive interrupt acknowledge bus cycles.

Setting of Accessed Bit in Segment Descriptors. When the master microprocessor accesses a segment descriptor and discovers that the accessed bit of the descriptor is not set, it is required to set this bit in the descriptor in memory. No other processor can be allowed to access this descriptor between the time that it is first accessed and the time that the accessed bit is set, since the second processor could wrongly assume that the descriptor had not been accessed. Therefore, the master microprocessor hardware automatically exerts the LOCK# signal during this time.

Setting the Busy Bit in Context Block Descriptors. Master Microprocessor context blocks are not reentrant. Therefore, context block descriptors contain a busy bit to prevent nesting of context blocks or simultaneous usage of the same context block by multiprocessors. This latter precaution is facilitated by the exertion of the LOCK# signal from the time that the master microprocessor first accesses a new context block descriptor until the time that it has marked the descriptor as busy.

Locked Exchange Instruction. Semaphore test and set operations can be performed with the XCHG register and memory instruction. The master microprocessor causes the LOCK# signal to be exerted on the data read cycle of this instruction, which means that the external arbitration circuitry will not release the bus to any other bus master until after the following date write cycle.

MEMORY/IO SELECT

The M/IO# signal is provided to distinguish between memory bus cycles and I/O bus cycles. The timing of this signal is coincident with address information on the address bus and is input to the memory (209).

CODE/INTERRUPT ACKNOWLEDGE

The COD/INTA# signal is provided for two purposes. One purpose is to distinguish between code reads and other memory reads in order to support certain external devices such as a code cache. The other purpose of this signal is to flag interrupt acknowledge cycles in order to provide a signal which can qualify address mapper outputs since these outputs are invalid during interrupt acknowledge cycles due to the floating of the address bus.

BUS READY

The bus ready signal (READY#) is provided as a means of terminating bus cycles. All bus cycles except Halt cycles and Shutdown cycles are capable of being stretched from the minimum length to any longer length without limit. The means by which bus cycles are stretched is by external circuitry withholding the activation of the READY# signal.

The READY# signal is generated by a clock generator device which contains circuitry which is capable of synchronizing an asynchronous input.

Figure 4:
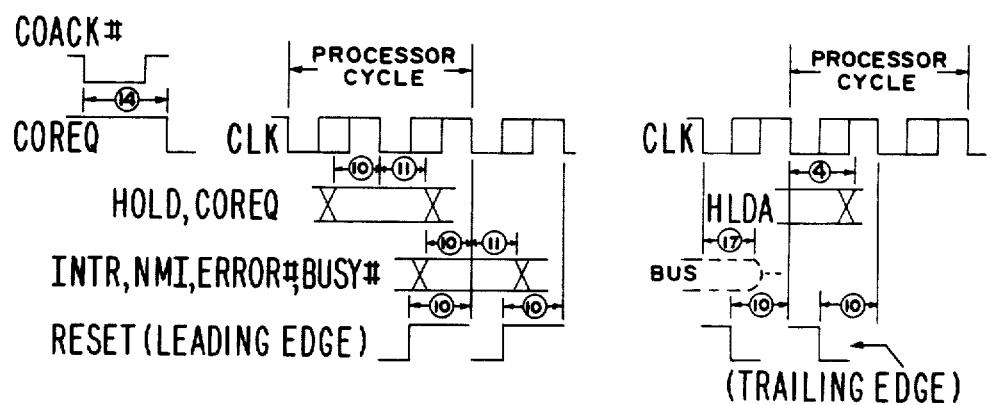
FIG. 4 is a timing diagram illustrating COREQ deactivation, asynchronous inputs, hold acknowledge, and reset.

The READY# is a fully synchronous input signal. This means that it must meet the setup and hold time specified in FIG. 4. READY# is sampled by the master microprocessor once each processor clock. Therefore, bus cycle length can be stretched only in increments of one processor clock and not in increments of CLK periods. Any activation of the READY# signal which does not meet the setup and hold times of FIG. 4 may cause erroneous operation of the master microprocessor.

T-STATES

During each consecutive pair of CLK cycles, the bus of the master microprocessor can be said to be in a certain T-state. T-states are offset, by one CLK cycle, from internal master microprocessor processor cycles. The various T-states are:

TI: The bus is idling.
T0: A new bus cycle is beginning.
T1: A bus cycle is proceeding.
T2I: A bus cycle is prepared for termination and no new cycle is beginning.
T20: The last bus cycle is prepared for termination and the next bus cycle is beginning.

A TI state can occur if the master microprocessor does not require a bus cycle. For example, if the internal master microprocessor pipeline is full and the master microprocessor execution unit is performing a long operation such as divide, then no prefetch or data cycle is required.

A T0 state is used to output the address and status of a new bus cycle.

A T1 state is used to allow the commands from the Bus Controller to become active and to output data if the bus cycle is for output.

A T2I state is used to terminate a bus cycle if the READY# signal is activated and if no new bus cycle is ready to begin. If the READY# signal is not activated, then a T2I or a T20 state will follow. Input data is accepted during this state if the bus cycle is for input and if READY# is activated.

A T20 state is used to terminate a bus cycle if the READY# signal is activated and if a new bus cycle is ready to begin. If the READY# signal is not activated, then a T2I or a T20 state will follow. Input data is accepted during this state if the bus cycle is for input and if READY# is activated. In addition, this state is used to output the address and status of the new bus cycle.

Address information is output during T0 or T20 and is held valid throughout T1. It is not held valid, however, during the following T2I or T20 cycle and, therefore, must be latched external to the master microprocessor.

T-STATE SEQUENCES

As operation begins after reset, the first bus cycle will cause the bus to sequence through the following T-states: TI, T0, T1, T20. The fourth T-state is T20 because the prefetch mechanism is ready for another code-read cycle. The fifth T-state will be either T20 if READY# has not been activated and a wait state is being inserted, or T1 if READY# has been activated.

If no wait states are required, then most bus operations will be a consecutive sequence of: T1, T20, T1, T20, . . . , etc. If one wait state is required in each bus cycle, then the sequence would be: T1, T20, T20, T1, T20, T20, . . . , etc.

Occasionally the master microprocessor will not be ready for a new bus cycle and a sequence such as: T1, T2I, TI, T0, T1, T20, . . . , etc., will occur as two processor cycles, for example, of bus bandwidth are lost.

In this way, maximum use of the bus results in T1, T20 sequences; wait states result in repeats of T20 or T2I; and nonuse of the bus results in TI states.

Bus timing AC characteristics are given in FIG. 3.

INTERRUPT ACKNOWLEDGE CYCLE

When the master microprocessor responds to the maskable interrupt, it performs two consecutive interrupt acknowledge cycles. These two cycles are performed with the LOCK# signal activated so that external arbitrators will not release the system bus to any other bus master. In addition, the internal master microprocessor arbiter will not permit any other bus cycle to separate the two interrupt acknowledge cycles.

An interrupt acknowledge cycle is classed as an input cycle. Only the second of the two cycles, however, actually inputs valid information (the interrupt vector as in the Intel 8086). On the first cycle the master microprocessor data bus drivers are made to float and the logic state of the data bus signals is ignored.

In addition, an interrupt acknowledge cycle is unusual because the address bus drivers are made to float. This is to allow an interrupt controller master to use the address bus to select a slave interrupt controller.

At the end of the second acknowledge cycle the float condition of the address bus is prolonged for an additional processor cycle to the end of the T20 state which terminates the second acknowledge cycle and begins the subsequent bus cycle. This features is necessary to avoid contention between address drivers and interrupt controller drivers and destroys address valid timing on the subsequent bus cycle. This problem is solved by the insertion of one wait state in the interrupt acknowledge cycle. Therefore, at least one wait state must be provided in interrupt acknowledge cycles.

HOLD

The master microprocessor can be made to surrender its bus due to a request on its HOLD pin. When the master microprocessor responds to the hold request, it activates the hold acknowledge (HLDA) pin and floats its bus, i.e., the drivers of all bus signals listed in Table II (except HLDA) are placed in the tristate condition. This hold condition can be maintained indefinitely as long as the hold request is exerted.

The HOLD signal is an asynchronous, static signal. Therefore it may be activated at any time without regard to the condition of the master microprocessor CLK input signal. It is not stored by the master microprocessor, however, so that it must be exerted as long as the hold condition is desired.

The master microprocessor bus unit gives HOLD the highest priority so that hold requests will normally be honored after the current bus cycle. Situations in which the hold request is not honored after the current bus cycle are:

1. If several bus cycles are made indivisible due to exertion of LOCK# (see BUS LOCK section);

2. The two (or three) bus cycles which are executed consecutively as part of a single Corporcessor Operand transfer (see Data channel Transactions section below); and 3. Word accesses on odd addresses.

At the minimum, the master microprocessor requires two full processor clock cycles in which to process the HOLD signal before the bus can enter the float condition. The HLDA signal is designed to be activated one-half processor clock cycle later so that the bus signals can be guaranteed to be in the float condition before HLDA is activated. Therefore, a HOLD signal activation which meets the setup time given in FIG. 4 will be acknowledge no sooner than 2.5 processor clock cycles later.

Maximum hold acknowledge latency is considered to be determined by the longest sequence of locked bus cycles which can occur at any level which is less privileged than the I0 privilege level. Therefore, maximum latency is 2.5 processor cycles for internal processing plus 12 cycles for a maximum locked sequence plus 2 cycles for the current bus cycle. This gives a maximum latency time of 16.5 processor clock cycles which should be increased by whatever WAIT states are required for five bus cycles.

SLAVE COPROCESSOR INTERFACE

The master microprocessor operates with the slave microprocessor being a high-speed floating point coprocessor. The slave microprocessor can be, for example, a modified Intel 8087. The slave microprocessor operates local to and asynchronously with the master microprocessor.

INTEL 8086/8087 COMPATIBILITY

The master microprocessor/slave microprocessor processor pair is compatible with the Intel 8086/8087 processor pair when the master microprocessor is in Intel 8086 compatible mode. This compatibility is largely retained when the master microprocessor operates in protection mode. The incompatibility in protection mode is limited to error-handling routines which manipulate address pointers which are, of course, not compatible between the Intel 8086 and the protection mechanism of the master microprocessor. MATH errors are handled differently by the master microprocessor/slave microprocessor than in the Intel 8086/8087 system. In the Intel 8086/8087 system the maskable interrupt is used by the 8087 to signal the Intel 8086 that an error has occurred. The master microprocessor/slave microprocessor system only responds to MATH errors at certain well-defined times (the beginning of the WAIT instruction and certain ESC instruction, described below). Execution times and data transfer timing differs between the processor pairs. (See Data channel USE and WAIT instruction section.)

ESC INSTRUCTIONS

The software interface between the master microprocessor and slave microprocessor as seen by the programmer consists of the use of certain instructions, referred to in Intel 8086 literature as escape (ESC) instructions, which are placed in-line in the user's code. The master microprocessor hardware examines each ESC instruction and performs the appropriate operations corresponding to the type of ESC instruction. These operations include the sending of the proper command to the slave microprocessor and, in some cases, the sending of certain address pointers to the slave microprocessor.

WAIT INSTRUCTIONS

Since coprocessing is possible, the master microprocessor must avoid sending certain new commands to the slave microprocessor while the slave microprocessor is still busy calculating due to the last command. The master microprocessor hardware aids this synchronization by delaying the initiation of the second command until the first command is completed. In Intel 8086/8087 systems, this synchronization is left to the programmer who is required to place a WAIT instruction before the second ESC instruction. To support compatibility, the master microprocessor/slave microprocessor pair also operates correctly with these WAIT instructions. In addition, the use of WAIT in master microprocessor/slave microprocessor systems does not cause the deadlock situation which may be experienced in Intel 8086/8087 systems. Use of WAIT instructions is required in other cases in order to synchronize master microprocessor and slave microprocessor use of common memory.

MODE CONTROL

Three bits of the Machine Status Word are dedicated to MATH or other coprocessor operation.

MATH PRESENT FLAG (MP)

This flag tells the master microprocessor whether or not a slave microprocessor is present in the system.

EMULATE FLAG (EM)

If no slave microprocessor is present, then the EM flag tells the master microprocessor whether or not software emulation of ESC instructions is to take place. If software emulation is desired, then the master microprocessor will trap on each ESC instruction so that a trap handler can decode the ESC instruction and execute the proper routine before returning to the instruction which follows the ESC instruction.

TASK-SWITCHED FLAG (TS)

When the master microprocessor operates in protection mode, the internal content of the slave microprocessor should be considered as context which belongs to a particular master microprocessor task. Therefore, upon each task switch by the master microprocessor, it is necessary to either switch slave microprocessor context with memory or ensure that the new task will not use old slave microprocessor content. In order to reduce the overhead which would be necessary if every master microprocessor task switch automatically switched master microprocessor content, a Task-Switched (TS) flag is provided. This flag is automatically set by master microprocessor hardware upon any task switch. If the new task attempts an ESC or WAIT instruction execution, then a trap will occur so that the operating system can store slave microprocessor content in a memory block which corresponds to the old task and load slave microprocessor content in a memory block which corresponds to the new task. Before returning to the new task the operating system will reset the TS flag. In this way context switched overhead is minimized and coprocessing is maximized since a MATH operation initiated by the old task can proceed up to the time that a new task requires use of the slave microprocessor.

VIOLATION TRAPS

In addition to the normal protection violations which can occur due to use of a slave microprocessor, such as attempting to write slave microprocessor data to a read-only segment or a protected address, there are two violation traps which can occur due to the execution of an ESC or WAIT instruction.

MATH ERROR TRAP (ME)

The ME trap is provided to handle situations in which the slave microprocessor performs a calculation which results in an error. This trap can invoke an error handler which will provide diagnostic information to the user. The IP, CS, EA, and DS information which is passed from master microprocessor to slave microprocessor upon execution of certain ESC instruction (see ESC Instruction Categories section) will be of use here.

TABLE VI

DNA Trap Conditions

| NSW Flags | | DNA Trap Occurs On | | Comment |
|---|---|---|---|---|
| MP | EM | ESC | WAIT | |
| 0 | 0 | No | No | No slave microprocessor is used and no software emulation is used. ESC instructions can be used for some, as yet unspecified, external coprocessor. WAIT instructions may be used as a general test instruction for the condition of the BUSY# pin. This is also the normal mode for slave microprocessor use when the master microprocessor is in Intel 8086 compatible mode. |
| 0 | 1 | Yes | No | This is the mode for software emulation of ESC instructions. WAIT may be used as a general test instruction. |
| 1 | 0 | IF TS = 1 | IF TS = 1 | This is the mode for normal use of the slave microprocessor when the master microprocessor is in protection mode. |
| 1 | 1 | Don't Care | Don't Care | Nonsense case. Don't use. |

DEVICE-NOT-AVAILABLE-TRAP (DNA)

The DNA trap has two basic uses. One is in conjunction with the TS flag and is for situations which a new task wishes to use the slave microprocessor but the slave microprocessor content belongs to a different task (see Mode Control section above). The other use for this trap is in situations where no coprocessor is present and the user wishes to perform software emulation of ESC instructions (see Intel 8086/8087 Compatibility section above).

These traps may only occur at the times when the master microprocessor encounters an ESC or WAIT instruction. The ME trap occurs on most ESC instructions and the WAIT instruction if the ERROR# pin is active. If no slave microprocessor is present, the ERROR# pin will be strapped inactive. Table VII gives the conditions for the occurrence of the DNA trap.

COMPATIBILITY MODE/PROTECTION MODE

It is required that the slave microprocessor be aware of whether the master microprocessor is in Intel 8086-compatible mode or protection mode. This is required since the slave microprocessor must format address pointers differently in protection mode than it does in compatible mode in order to properly format context with the SAVE and RESTORE instruction. The method by which the slave microprocessor is informed of master microprocessor mode is as follows:

1. At reset the slave microprocessor assumes that the master microprocessor is in compatible mode.
2. In the software sequence on the master microprocessor where the programmer selects protection mode, the programmer places a SETPM ESC instruction which is interpreted by the slave microprocessor as a command to switch to protection mode.

The master microprocessor is forced to compatible mode at reset, and is switched to protection mode only by the programmer. Since it cannot be switched back to compatible mode except by reset (or ICE breakpoint), this method of mode control is sufficient.

ICE must be given special attention since it is the only case in which a switch of the master microprocessor from protection mode to compatibility mode can occur (except for reset). The intention is that the ICE software only uses the SAVE and RESTORE instructions to access the slave microprocessor and that ICE software begins execution following an ICE breakpoint in compatibility mode and then switches to protection mode for the bulk of its operations.

When ICE software performs its switch to protection mode, it does not execute the SETPM ESC instruction which informs the slave microprocessor that the master microprocessor is switching to protection mode. Therefore the slave microprocessor retains its compatibility mode/protection mode status and is not affected by the ICE breakpoint or the return from ICE. If ICE software executes a SAVE instruction, the slave microprocessor will format the address pointers as appropriate due to its compatibility mode/protection mode status. Before the ICE software can examine the address pointers in the slave microprocessor context which is stored in ICE memory by the SAVE instruction, it must monitor the Protection Enable Flag (PE) of the MSW in the processor dump block in ICE memory. This is necessary to determine whether the slave microprocessor context corresponds to compatibility mode or protection mode.

MATH HARDWARE INTERFACE

The slave microprocessor operates with the master microprocessor as a local, slave device. The master microprocessor initiates slave microprocessor operations by sending commands to the slave microprocessor. This is accomplished by performing I/O write cycles to a reserved I/O address. The master microprocessor monitors the instantaneous condition of the slave microprocessor by use of the two dedicated signals, BUSY# and ERROR#, which go directly from the slave microprocessor to the master microprocessor. In addition the master microprocessor can send address pointers to the slave microprocessor by performing I/O writes to a reserved I/O address and can read certain data or status from the slave microprocessor by performing I/O reads from a reserved I/O address. Movement of data operands between slave microprocessor and main memory is facilitated by the inclusion in the master microprocessor of a Coprocessor Data Channel. As the slave microprocessor requires operand transfers, it makes requests to the Coprocessor Data Channel. The master microprocessor performs the operand transfer in conformance with the rules of protection (or unprotected if the master microprocessor is in compatibility mode). The rules of protection are more fully described in the above-identified Childs Jr. et al patent.

ESC INSTRUCTION DETECTION

The master microprocessor examines its instruction stream in order to detect ESC instructions. Upon detection of an ESC instruction, the master microprocessor will first perform some internal operation and then communicate with the slave microprocessor. The nature of these internal operations is dependent upon the particular ESC instruction which is encountered.

ESC INSTRUCTION CATEGORIES

The master microprocessor treats ESC instructions as one of eight different categories. A brief description of the categories and a list of the operations performed by the master microprocessor hardware follows:

Category 1. Instructions which move five words or less from memory to slave microprocessor (e.g., ADD memory to stack). Master Microprocessor Operations (see Master Microprocessor MATH Operations section below):
 1. Emulation Test
 2. Task-Switched Test
 3. Idle on Busy
 4. Error Test
 5. Send ESC
 6. Load Data Channel for Memory to Slave Microprocessor Transfers
 7. Send IP, CS
 8. Send EA, DS.

Category 2. Instructions which move five words or less from slave microprocessor to memory (e.g., STORE stack in memory). Master Microprocessor Operations:
 1. Emulation Test
 2. Task-Switched Test
 3. Idle on Busy
 4. Error Test
 5. Send ESC
 6. Load Data Channel for Slave Microprocessor to Memory Transfers
 7. Send IP, CS
 8. Send EA, DS.

Category 3. Instructions which cause slave microprocessor calculations but do not require memory transfers (e.g., INCREMENT top). Master Microprocessor Operations:
 1. Emulation Test
 2. Task-Switched Test
 3. Idle on Busy
 4. Error Test
 5. Send ESC
 6. Send IP, CS.

Category 4. Instructions which simply change slave microprocessor status (e.g., CLEAR ERROR, INITIALIZE, SETPM). Master Microprocessor Operations:
 1. Emulation Test
 2. Task-Switched Test
 3. Send ESC.

Category 5. Instructions which write one control or status word from slave microprocessor to memory (e.g., READ CONTROL). Master Microprocessor Operations:
 1. Emulation Test
 2. Task-Switched Test
 3. Idle on Busy
 4. Send ESC
 5. I/O Read, Memory Write.

Category 6. Instructions which move 47 words or less from slave microprocessor to memory (the SAVE and STASTT instructions). Master Microprocessor Operations:
 1. Emulation Test
 2. Task-Switched Test
 3. Idle on Busy
 4. Send ESC
 5. Load Data Channel for Slave Microprocessor to Memory Transfers.

Category 7. Instructions which move 47 words or less from memory to slave microprocessor (e.g., RESTORE, SETCTL, LDASTT instructions). Master Microprocessor Operations:
 1. Emulation Test
 2. Task-Switched Test
 3. Idle on Busy
 4. Send ESC
 5. Load Data Channel for memory to Slave Microprocessor Transfers.

Category 8. Instructions which read one control or status word from slave microprocessor to master microprocessor accumulator.
 1. Emulation Test
 2. Task-Switched Test
 3. Idle on Busy
 4. Send ESC
 5. I/O Read at AX.

MASTER MICROPROCESSOR MATH OPERATIONS

A description of the various operations which the master microprocessor may perform after encountering an ESC instruction follows:

EMULATION TEST

For this operation the master microprocessor performs a DNA trap if it is in the mode for software emulation of ESC instructions (i.e., EM=1). The DNA trap will leave the return link pointing to the first byte of the ESC instruction (or to the prefix byte if any are present). Therefore, the emulation software can decode the ESC instruction in a straightforward manner without first being forced to backup the pointer. As the emulation software decodes the ESC instruction, it should step the return link point so that, at the end of the emulation routine, the return from trap will cause execution to resume at the first instruction following the ESC instruction. Therefore, the ESC instruction will not be restarted and further operations of the ESC instruction category will not be performed.

TASK-SWITCHED TEST

For this operation the master microprocessor performs a DNA trap if it is in the mode where the slave microprocessor is present (MP=1) and the master micrprocessor content may not correspond to the current task (TS=1). The DNA trap will invoke an operating system procedure (herein called the TS Trap Handler) which will perform the following steps in the following sequence:
 1. Reset TS.
 2. Return if the current task "owns" the slave microprocessor.

3. Record the current task as the slave microprocessor owner.
4. Use a SAVE ESC instruction to store slave microprocessor content in the old slave microprocessor owner save area.
5. Use a RESTORE ESC instruction to load slave microprocessor content from the new slave microprocessor owner save area.
6. Return.

Since task switches may occur during execution of the TS Trap Handler, it is advisable to make use of a semaphore in order to execute Steps 3, 4, and 5 as a critical region. Notice that Step 2 will provide for nesting of the TS Trap Handler.

The DNA trap leaves the return link pointing to the first byte of the trapped instruction (or to the first prefix byte if any are present). Therefore, the return from trap will cause restart of the trapped instruction. This time TS will be reset so that the Tasked-Switched Test will fail and the remaining operations of the ESC instruction category will be executed.

IDLE ON BUSY

For this operation the master microprocessor tests BUSY# from the slave microprocessor and waits until the slave microprocessor indicates that it is not busy before the master microprocessor proceeds to the next operation of the particular category.

Whenever the slave microprocessor begins execution of any ESC instruction except for those of Categories 4 or 5, it will immediately indicate busy on its BUSY# pin. When the slave microprocessor completes the ESC instruction, whether or not it results in an error, it will indicate not busy on its BUSY# pin. If the ESC instruction does result in an error, it will indicate error on its ERROR# pin for at least 100 ns before it indicates not busy on its BUSY# pin so that there is no interval in which it indicates not busy and no error.

The master microprocessor is interruptable during this idling time. If an interrupt does occur, the return link will point to the first byte of the interrupted instruction (or first prefix byte) so that the return from interrupt will cause restart of the instruction from the beginning.

LOAD DATA CHANNEL FOR SLAVE MICROPROCESSOR TRANSFERS TO/FROM MEMORY

Figure 5:
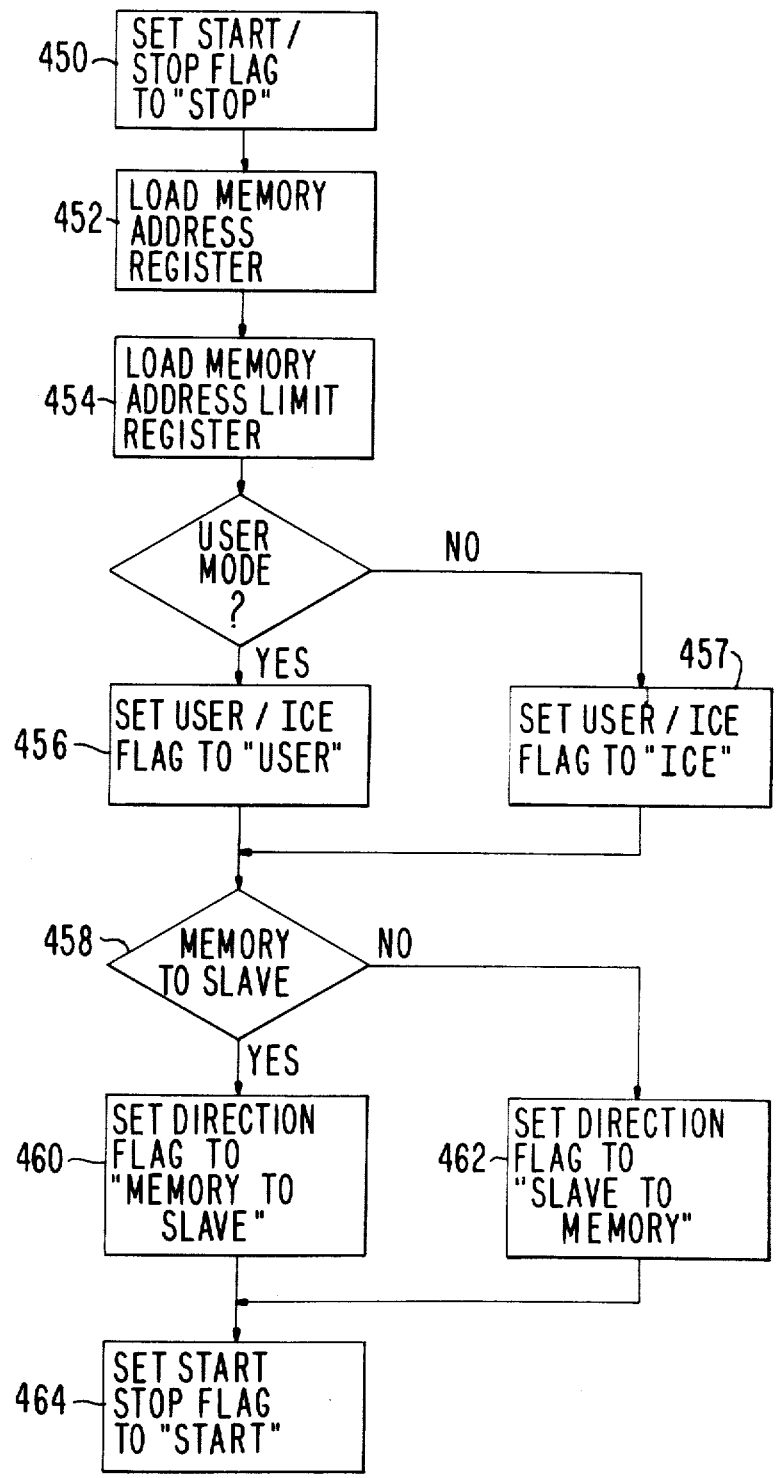
FIG. 5 is a logic flow chart of the data channel initialization sequence.
Figure 6:
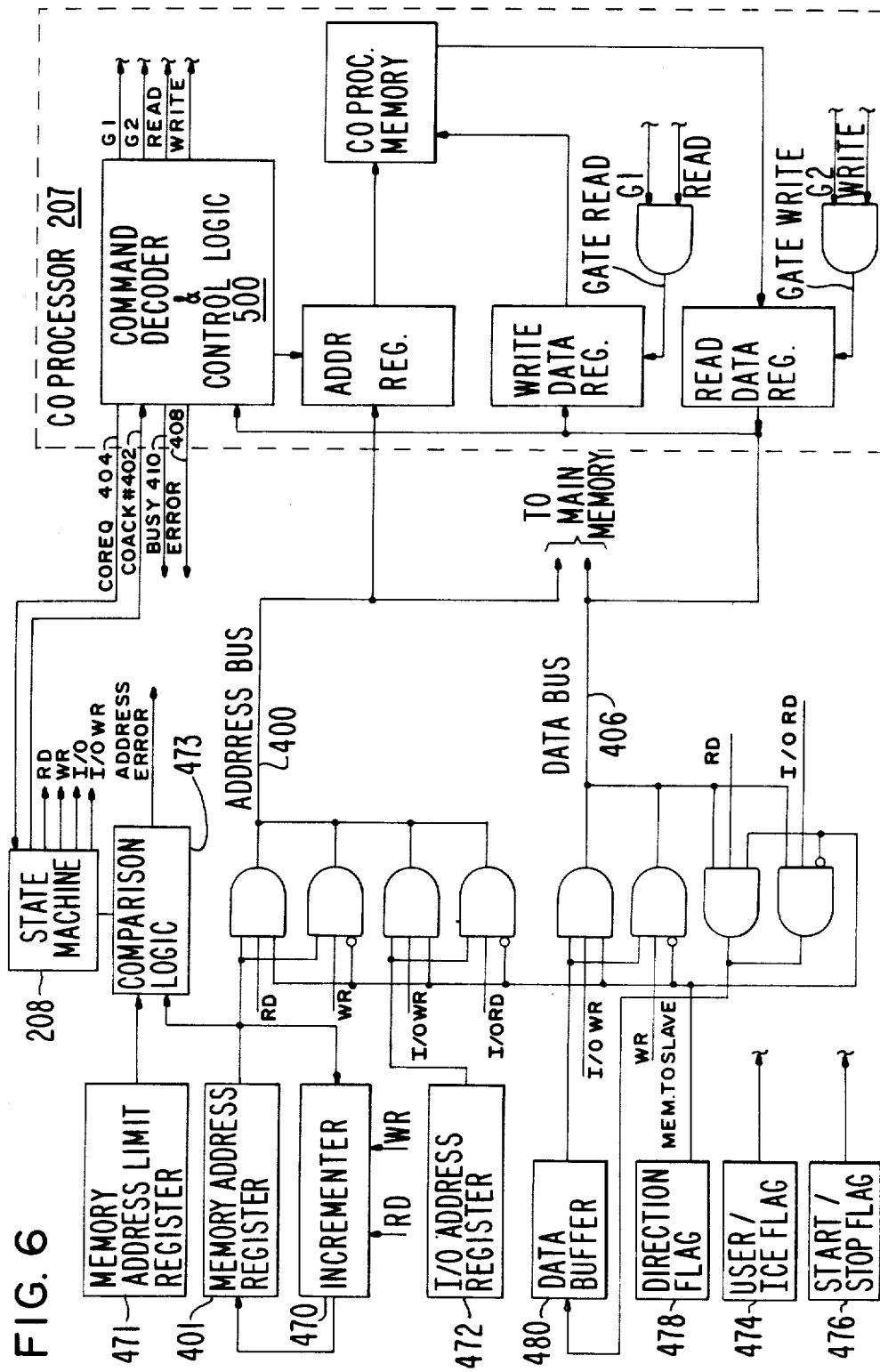
FIG. 6 is a block diagram illustrating the essential components of the data channel.

The master microprocessor logic performs on automatic initialization of the Data Channel. The block diagram of FIG. 6 shows the essential components of the data channel. (see Coprocessor Data Channel section below). This initialization is illustrated by the logic flow chart of FIG. 5 and consists of:
1. Setting the start/stop flag to "stop" (block 450).
2. Loading the memory address register (MAR) with the sum of the selected segment base and the effective address as specified by the mod, r/m byte of the ESC instruction (block 452).
3. Loading the memory address limit register with the sum of the base and limit for the selected segment (block 454).
4. Setting the user/ICE flag to "user mode" (block 456) or "ICE" mode (block 457).
5. Setting the direction flag to "memory to slave microprocessor" (block 460) or "slave to memory" (block 462).
6. Setting the start/stop flag to "start" (464).

I/O READ, MEMORY WRITE

For this operation the master microprocessor performs an I/O Read cycle with the address bus equal to the contents of the I/O address register (0000FCH), a reversed I/O address. The slave microprocessor responds to this cycle by returning a data word to the master microprocessor over the data bus. The master microprocessor then performs a memory write cycle which writes this data word into memory at the memory address indicated by the effective address of the ESC instruction (with normal segment translation as specified by the compatibility Mode/protection Mode control).

SEND ESC

For this operation the master microprocessor performs an I/O write cycle with address bus equal to 0000FCH, a reserved I/O address, and the data bus equal to the first two bytes of the ESC instruction.

SEND IP, CS

For this operation the master microprocessor performs two I/O write cycles with address bus equal to 0000FEH, a reserved I/O address. On the first cycle the data bus is equal the current value of the IP register (i.e, the value corresponding to the first byte of the ESC instruction, or first prefix byte if any are present). On the second cycle the data bus is equal to the current contents of the CS register.

SEND EA, DS

For this operation the master microprocessor performs two I/O write cycles with the address bus equal to 0000FEH, a reserved I/O address. On the first cycle the data bus is equal to the effective address as specified by the second byte of the ESC instruction. On the second cycle the data bus is equal to the current contents of the DS register (or other segment register if a segment override prefix is used).

I/O READ TO AX

For this operation the master microprocessor performs an I/O Read cycle with address bus equal 0000FCH, a reserved I/O address. The slave microprocessor responds to this command by returning a data word to the master microprocessor over the data bus. The master microprocessor accepts this data word and places it in its AX register.

ESC INSTRUCTION DECODING

As the master microprocessor encounters ESC instructions, it decodes each instruction into one of the eight categories given in the above ESC Instruction Categories section and performs the operations required for that category. The format of the ESC instruction is:

| 11011 I10 I9 I8 | I7 I6 I5 I4 I3 I2 I1 I0 |
| --- | --- |

I10 through I0 are mapped into the eight categories.

WAIT INSTRUCTION

Due to the Idle on Busy operation performed by the master microprocessor on certain ESC instructions, the WAIT instruction necessary for Intel 8086/8087 systems is not always required for master microprocessor/slave microprocessor operation. However, in order to support compatibility it is allowable for the master microprocessor to encounter WAIT instructions in its instruction stream even in cases where it is not required. There are cases involving use of common memory by master microprocessor and slave microprocessor, in which the use of WAIT instructions is required (see Data Channel Use and WAIT Instruction section below). In addition it is possible, if no slave microprocessor is present in the system, to use the WAIT instruction as a general test of whatever signal is connected to the BUSY# pin.

The operations performed by the master microprocessor after encountering a WAIT instruction are:
1. Task-Switched Test
2. Idle on Busy
3. Error Test.

The description of this operation is given in the Master Microprocessor MATH Operations section above.

COPROCESSOR DATA CHANNEL

The master microprocessor has a Coprocessor Data Channel to control the transfer of operands between the slave microprocessor and memory. This channel is of high speed, low latency, and is fully memory protected. FIG. 6 is a block diagram illustrating the essential components of the data channel and the logic within the coprocessor which interacts with this channel. It will be understood by thise skilled in the art that in practice the logic shown in FIG. 6 would be implemented by means of LSI technology, such as, for example, a programmable logic array (PLA).

The Coprocessor Data Channel contains a memory address buffer register (401) with incrementer (470), a memory address limit register (471), a hardwired I/O address, OOFDH, (472), a user/ICE flag (474), a start/-stop flag (476), and a direction flag (478). The data buffer (480) shown in FIG. 6 is located within the data section (420) of FIG. 2.

As described above with reference to FIG. 5, these registers are initialized by the master microprocessor when the master microprocessor Execution Unit encounters an ESC instruction or a WAIT instruction (see ESC Instruction Categories and Master Microprocessor MATH Operations above).

COPROCESSOR OPERAND REQUEST

After the Coprocessor Data Channel has been initialized, it is ready to control operand transfers.

Operand transfers are initiated by the control logic (500) in the the slave microprocessor (207) activating the Coprocessor Operand Request signal (COREQ-404). This signal is asynchronous and level sensitive so that it may be activated without regard to the phase of the master microprocessor clock. COREQ must be continuously activated until it is acknowledged by the master microprocessor activating the Coprocessor Acknowledge signal (COACK#-402).

The master microprocessor samples the COREQ signal during an interval from slightly before the negative-going edge of the CLK signal which begins a bus T-state (see T-States section above) until slightly after the same edge. This interval is herein called the sample interval and the size of this sample interval is specified in FIG. 4 by COREQ setup and hold times. If the COREQ signal is at one valid logic level throughout this sample interval then the master microprocessor is guaranteed to interpret it as being at that logic level. If the COREQ signal does not remain at one valid logic level throughout the sample interval, then the master microprocessor may interpret it as being in either logic level.

DATA CHANNEL TRANSACTIONS

A Data Channel transaction is defined as the movement of one word of data from memory to slave microprocessor or from slave microprocessor to memory.

Data transfers are indirect (i.e., data is transferred through the master microprocessor rather than directly between memory and slave microprocessor). Therefore, each Data Channel transaction requires two or three master microprocessor bus cycles (see below). Transactions are treated as indivisible operations by the master microprocessor (i.e., no non-Data Channel bus cycles may intervene). The bus cycles are not, however, forced to be contiguous on the bus (i.e., the LOCK# signal is not exerted).

All Data Channel transactions are for word transfers (no byte transfers are required by the slave microprocessor or permitted by the master microprocessor). Therefore, if the word is placed at an odd memory location, two memory cycles will be required, whereas one would be sufficient if the work were placed at an even address. Highest performance is achieved by placing all MATH operands at even addresses.

MATH operands may consist of several words depending on the precision of the operand. In any case, the slave microprocessor will make enough requests to cause enough Data Channel transactions to account for the entire operand.

Four different types of Data Channel transactions are possible. These four types and the sequence of events of which they consist are given below:

MEMORY TO SLAVE MICROPROCESSOR, EVEN MEMORY ADDRESS

1. The channel memory address register (401) and the channel address limit register (471) are compared in comparison logic (473) and a MATH address error trap is generated if the address and limit are equal or if the limit is exactly one count higher than the address. Otherwise, operation continues.

2. A memory-read cycle (RD) is generated by state machine (208) to gate the address from the channel memory address register onto the address bus (400). The read data fetched from main memory is placed in data buffer (480). The Bus High Enable signal is active (see Bus High Enable section above). The slave microprocessor's request is acknowledged (see Coprocessor Operand Acknowledge section below).

3. The memory address register is incremented by two by means of the incrementer (470).

4. An I/O write cycle (I/O WR) is generated by state machine (208) to gate the address OOFDH from the I/O address register onto the address bus (400) and the data in data buffer (480), which is the data read in Step 2, onto the data bus (406).

SLAVE MICROPROCESSOR TO MEMORY, EVEN ADDRESS

1. The channel memory address register (401) and the Channel address limit register (471) are compared and a MATH address error trap is generated if the address and limit are equal or if the limit is exactly one count higher than the address. Otherwise, the operation continues.

2. An I/O read cycle (I/O RD) is generated with address equal to OOFDH. The read data is buffered in data buffer (480). The slave microprocessor's request is acknowledged.

3. A memory write cycle (WR) is generated with address taken from the memory address register (401) and data equal to the contents of data buffer (480), that is the data read in Step 2. The Bus High Enable signal is active.

4. The memory address register (401) is incremented by two.

MEMORY TO SLAVE MICROPROCESSOR, ODD MEMORY ADDRESS

1. The channel memory address register and the channel address limit register are compared and a MATH address limit trap is generated if the address and limit are exactly equal. Otherwise, operation continues.

2. A memory ready cycle is generated with address taken from the channel memory address register. The high-order byte of read data is buffered in the data buffer. The Bus High Enable signal is active. The slave microprocessor's request is acknowledged.

3. The memory address register is incremented by one.

4. Same as Step 1 above.

5. A memory read cycle is generated with address taken from the channel memory address register. The low-order byte of read data is buffered inside the master microprocessor. The Bus High Enable signal is inactive.

6. The memory address register is incremented by one.

7. An I/O write cycle is generated with address equal to OOFDH and data equal to that buffered in Steps 2 and 5 above with bytes crossed (Logic for crossing bytes is shown in FIG. 3 of the above-referenced Childs, et al patent application).

SLAVE MICROPROCESSOR TO MEMORY, ODD MEMORY ADDRESS

1. The channel memory address register and the channel address limit register are compared and a MATH address error trap is generated if the address and limit are equal, otherwise, operation continues.

2. An I/O read cycle is generated with address equal to OOFDH. The read data is buffered in the data buffer. The slave microprocessor's request is acknowledged.

3. A memory write cycle is generated with address taken from the memory address register. The high-order data byte is equal to the low-order byte of the data buffered in Step 2 and the low-order data byte is don't care. The Bus High Enable signal is active.

4. The memory address register is incremented by one.

5. Same as Step 1 above.

6. A memory-write cycle is generated with address taken from the channel memory address register. The low-order data byte is equal to the high-order byte of the data buffered in Step 2 and the high-order byte is don't care. The Bus High Enable signal is inactive.

7. The memory address register is incremented by one.

COPROCESSOR OPERAND ACKNOWLEDGE

Following initialization of the Data Channel by the master microprocessor, activation of the COREQ signal by the control logic (500) in the slave microprocessor will result, unless a MATH address error occurs. Since COREQ is a level-sensitive signal it must be continuously activated by the slave microprocessor until such time as the master microprocessor has responded to the request and started a Data Channel transaction. However, if the slave microprocessor desires only one Data Channel transaction, then it is important that it drop COREQ, otherwise the master microprocessor will complete one transaction, sample COREQ as active, and perform a second, undesired, transaction.

This difficulty is prevented by the master microprocessor acknowledging the request of the slave microprocessor at the time that it begins the corresponding Data Channel transaction. This is done by the activation of the Coprocessor Operand Acknowledge signal (COACK#) by the master microprocessor at the beginning of the first bus cycle of a Data Channel transaction. If the slave microprocessor deactivates the COREQ signal within the time limit specified from COACK# activation in FIG. 4, then no additional Data Channel transactions will occur.

DATA CHANNEL LATENCY

The elapsed time from the activation of COREQ until the activation of COACK# is defined to be the latency time of the data channel. This latency time is not a constant and will, in normal operation, vary between a minimum value and a maximum value.

MINIMUM LATENCY

The master microprocessor requires two full processor cycles to synchronize and prioritize COREQ and one-half processor cycle to begin the activation of COACK#. Therefore, the minimum latency time is 2.5 processor cycles (8 MHz) minus one COREQ hold time plus one COACK# minimum output delay time (see FIG. 4).

MAXIMUM LATENCY

Latency time will increase from the minimum time whenever the master microprocessor is busy with other operations and cannot immediately respond to COREQ. In fact since the Bus Hold Request is given higher priority by the master microprocessor, maximum Data Channel latency could be stretched indefinitely long (see Instructions Processing section of the above-referenced Childs, et al patent application for how requests are prioritized).

If the effect of Bus Hold on Data Channel latency is ignored, then the maximum latency time will be determined by the longest sequence of locked bus cycles which can occur at any level which is less privileged than the IO privilege level. In this case latency in increased by 12 processor cycles. Therefore, maximum Data Channel latency can be said to be 14.5 processor cycles (8 MHz) plus one COREQ setup time plus one COACK# maximum output delay. This time should be increased to account for the WAIT states required, if any, in four bus cycles.

DATA CHANNEL DATA RATE

The Data Channel is capable of operating at a burst rate in which transactions are performed at the rate of one every four processor cycles. This allows two processor cycles for both the memory cycle and the I/O cycle. This rate will decrease, of course, if WAIT states are required in either the memory cycles or the I/O cycles or if the operands are at odd memory address (see Data Channel Transactions section above).

This burst rate is maintained by the master microprocessor as long as the slave microprocessor continues to activate COREQ. If COREQ is deactivated within the specified time from COACK# activation then the burst of transactions is terminated and the master microprocessor will begin performing non-Data Channel bus cycles. If the slave microprocessor again activates COREQ, a Data Channel latency time will be lost before the master microprocessor resumes Data Channel transactions.

DATA CHANNEL USE AND WAIT INSTRUCTION

A single ESC instruction may cause movement of many operands between memory and slave microprocessor. For example, the SAVE instruction requires 15 operands to be moved from slave microprocessor to memory. Individual operands may require several Data Channel transactions. For example, operands in the FILE format consist of 80 bits of information and require five Data Channel transactions of movement. Each Data Channel transaction moves 16 bits of information and requires two (or three for words at odd addresses) bus cycles. Each bus cycle requires two (or more, if WAIT states are required) processory cycles.

Most ESC instructions require movement of only one operand. Since the longest MATH operand is five words, these operands can be moved in, at most, five Data Channel transactions. Some ESC instructions, such as SAVE, move many operands and can require up to 47 Data Channel transactions. The master microprocessor Data Channel is capable of performing all 47 transactions in a continuous burst. However, in some cases, the slave microprocessor may be unable to support this burst rate due to its own internal delays in processing the individual words.

When the slave microprocessor reaches a point when it is not ready for the next Data Channel transaction, it will postpone that transaction by deactivating its COREQ signal. At this point the master microprocessor will begin performing non-Data Channel bus cycles (i.e., it will resume execution of its instruction stream). Since the master microprocessor and slave microprocessor are not clock synchronous (they may operate at different frequencies) and since the exact amount of time required by the slave microprocessor to process Data Channel data is very difficult to predict, it is not certain as to exactly how many bus cycles the master microprocessor will perform and how many instructions it will execute during these gaps between Data Channel transactions.

Consider a situation in which a programmer wishes to store the slave microprocessor content into a memory block by use of the SAVE ESC instruction and then access the memory block with normal master microprocessor instructions. It is possible that enough gaps in Data Channel transactions will occur to allow the master microprocessor to execute the instruction which accesses the memory block before the SAVE instruction is complete and, therefore, the old data in the memory block is accessed by the master microprocessor. This problem can be prevented by the use of a WAIT instruction placed in the master microprocessor instruction stream between the SAVE instruction and the instruction which accesses the memory block. This WAIT instruction will cause the master microprocessor to stop executing instructions until the SAVE instruction has completed (and all 47 words are transferred).

While the master microprocessor is idling on the WAIT instruction, it will respond to interrupts in the normal way. It should be understood, however, that the processing of the interrupt will be slowed because the master microprocessor can generate bus cycles only in the "gaps" between Data Channel transactions.

The above precaution should be applied to all ESC instructions which use the Data Channel for movement of data from slave microprocessor to memory. This situation also exists for the Intel 8086/8087 processor pair and programs written with the proper use of WAIT instructions will operate equally reliably on the Intel 8086/8087, and the master microprocessor/slave microprocessor. It should be pointed out, however, that programs which do not use the WAIT instruction in the recommended way may provide different results on the two processor pairs. Since the master microprocessor and slave microprocessor operate on separate clock rates while the Intel 8086 and 8087 are clock synchronous, a program with a missing WAIT instruction may yield "correct" results on one pair and "incorrect" results on the other pair.

Another situation exists which is the dual of the above situation. Assume that a programmer wishes to load the slave microprocessor content from a memory block by use of the RESTORE ESC instruction and then modify the memory block with normal master microprocessor instructions. It is possible that enough gaps may occur in Data Channel transactions to permit the memory block to be modified before all the old data was moved. The solution is, again, to require that a WAIT instruction be placed in the master microprocessor instruction stream between the RESTORE and the modification of the memory block by the master microprocessor.

There are similar cases, however, in which WAIT instructions are not required. These cases are for ESC instructions which require only five words or less to be moved from memory to slave microprocessor. These ESC instructions are such that the slave microprocessor will burst the data out of memory before the master microprocessor can begin instruction execution.

By examining the ESC instruction categories given in the ESC Instruction Categories section above, the situation can be summarized by specifying that careful use of WAIT instructions is required when using instructions from categories 2, 6, and 7 in order to provide proper synchronization between Data Channel transfers and master microprocessor instructions. No such restriction is necessary for categories 3, 4, 5, and 8 which do not use the Data Channel or for category 1 which does use the Data Channel but provides automatic synchronization.

SUMMARY

A slave microprocessor operates with the master microprocessor as a local, slave device. The master microprocessor initiates slave microprocessor operations by sending commands to the slave microprocessor. This is accomplished by performing I/O write cycles to a reserved I/O address on the slave miroprocessor memory. The master microprocessor monitors the instantaneous condition of the slave microprocessor by use of the two dedicated signals, BUSY# (410) and ERROR# (408), which go directly from the slave microprocessor to the master microprocessor. In addition the master microprocessor can send address pointers to the slave microprocessor by performing I/O writes to a reserved I/O address and can read certain data or status from the slave microprocessor by performing I/O reads from a reserved I/O address. As the slave microprocessor requires operand transfers, it makes requests to a Coprocessor Data Channel in the master microprocessor. The master microprocessor performs the operand transfer in conformance with the rules of protection (or unprotected if the master microprocessor is in compatibility mode).

While the invention has been particularly shown and described with reference to a preferred embodiment thereof, it will be understod by those skilled in the art that the foregoing and other changes in form and detail may be made therein without departing from the spirit and scope of the invention.

What is claimed is:

1. For use with a main memory and an interface between a master microprocessor and a slave coprocessor, said master microprocessor, said slave coprocessor, and said memory being connected to a common memory address bus and a comon data bus, wherein data transfers between said slave coprocessor and said main memory all pass through said master microprocessor and main memory address information is subjected to a protection mechanism in said master microprocessor, a data channel within said master microprocessor comprising:

control logic connected to a first signal line for receiving signals from said coprocessor, and to a second signal line (COACK#) for sending signals to said coprocessor, said control logic including first transferring means;

said control logic including timing means connected to said first transferring means for generating timing signals defining cycles including a write cycle, a read cycle, an I/O read cycle, and an I/O write cycle;

a memory address register connected to said address bus, said memory address register containing an address therein corresponding to a main memory address;

a memory address limit register;

means for loading said memory address limit register with a limit value associated with said coprocessor in response to energization of said first signal line;

memory protection means connected to said memory address register, said memory protection means including logic for comparing the contents of said memory address register with said memory address limit value and for causing an addressing error signal to be generated upon the condition that said contents of said memory address register and said memory address limit value do not meet a specified comparision criterion, an I/O address register connected to said address bus, said I/O address register containing a predetermined address therein corresponding to an I/O address of said coprocessor reserved for data transfers to and from said main memory;

a data buffer register for storing data therein, said data buffer register being connected to said data bus and to said control logic;

said first transferring means including second means responsive to said timing means and said first signal line (COREQ) for transferring data between said main memory and said data buffer register during said read cycle, said data being accessible at an address location in said main memory corresponding to said address stored in said memory address register, said first transferring means including third means for energizing said second signal line (COACK#) in response to energization of said first signal line (COREQ) by said coprocessor, to thereby acknowledge a coprocessor request during said read cycle;

incrementing means connected to said timing means, to said first transferring means and to said memory address register, responsive to said first transferring means in said control logic, operative during said read cycle upon the completion of data transfer to said data buffer, for incrementing the contents of said memory address register; and, gating means connected to said data buffer register, said data bus, said I/O address register, said address bus, and to said timing means, operative during said I/O write cycle, for placing said data in said data buffer register on said data bus and for placing said predetermined address in said I/O address register on said address bus to thereby transmit said data in said data buffer register and said predetermined address corresponding to said I/O address of said coprocessor to said slave coprocessor.

2. The combination in accordance with claim 1 wherein:

said comparing logic including means for generating said addressing error signal upon the condition that said contents of said memory address register and said contents of said address limit register are equal or if said contents of said address limit register is exactly one count higher than said contents of said address limit register.

3. The combination in accordance with claim 1 wherein:

said control logic further includes second transferring means connected to said first signal line, said second signal line, and to said timing means, said second transferring means being responsive to said first signal line for transferring data between said slave coprocessor and said data register during said I/O read cycle, said data being accessed from an I/O address of said coprocessor corresponding to said predetermined address stored in said I/O address register, said second transferring means including means for energizing said second signal line to acknowledge said coprocessor request during said I/O read cycle;

said incrementing means including first incrementing means responsive to said timing means, operative during said I/O read cycle, for incrementing the contents of said memory address register; and, said gating means including second means responsive to said control logic, operative during said write cycle, for placing the contents of said data buffer register on said data bus and for placing the contents of said memory address register on said address but to thereby transmit said data and said address to said main memory.

4. The combination in accordance with claim 2 further comprising:

second transferring means responsive to said first signal line for transferring data between said slave coprocessor and said data register during an I/O read cycle, said data being accessed from an I/O address of said coprocessor corresponding to a predetermined address stored in said I/O address register, said second transferring means including means for energizing said second signal line to acknowledge said coprocessor request during said I/O read cycle;

said incrementing means including first incrementing means responsive to said timing means, operative during said I/O read cycle, for incrementing the contents of said memory address register; and, said gating means including second means responsive to said timing means, operative during a write cycle, for placing the contents of said data buffer register on said data bus and for placing the contents of said memory address register on said address bus to thereby transmit said data and said address to said main memory.

* * * * *